Patented July 15, 1952

2,603,648

UNITED STATES PATENT OFFICE 2,603,648

PREPARATION OF 2-MERCAPTO THIAZOLES

James T. Gregory, Akron, Ohio, assignor to The B. F. Goodrich Company, New York, N. Y., a corporation of New York No Drawing. Application October 18, 1951, Serial No. 251,997

3 Claims. (Cl. 260—302)

This invention relates to a novel reaction of alpha-thiocyano carbonyl compounds and more specifically pertains to the reaction of alpha-thiocyano carbonyl compounds with thiourea whereby a 2-mercapto thiazole is formed.

I have discovered that an alpha-thiocyano carbonyl compound; that is, an aldehyde or ketone having a thiocyano group attached to the carbon which is immediately adjacent to the carbonyl carbon of the aldehyde or ketone, will react with thiourea in the presence of an aqueous medium acidified with mineral acid to produce a 2-mercapto thiazole with the formation of cyanamide and splitting out of water. This reaction is believed to take place as follows:

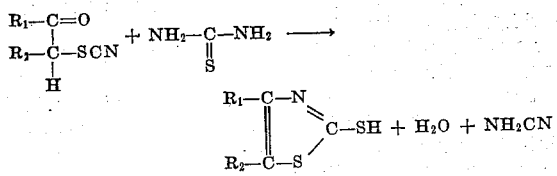

wherein $R_1$ and $R_2$ comprise the non-reactive residue of the thiocyano carbonyl. Generally $R_1$ and $R_2$ are hydrogen or hydrocarbon radicals containing from 1 to 10 carbon atoms.

It is believed that the thiocyano carbonyl reacts with the thiourea first splitting out water to close the thiazole ring to form a non-isolatable intermediate having the probable structure

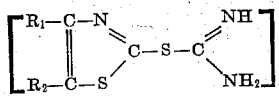

Then on heating during the reaction, cyanamide splits off and the mercapto group is formed. The cyanamide can be recovered, and may be reacted with $H_2S$ in the presence of ammonia to prepare more thiourea.

This novel reaction provides a new method for preparing 2-mercaptothiazoles. It is a particularly useful process and has many advantages over the prior art methods for preparing 2-mercaptothiazoles. The methods for the preparation of 2-mercaptothiazoles which the prior art discloses and which have been employed in industrial preparations of 2-mercaptothiazoles involve the use of chlorinated reactants, especially alpha-chloro ketones. These chloro ketones are, in general, lachrymators and cause no little discomfort when, through leaks in the processing equipment, they escape to the atmosphere in which the chemical operators work. Also these chloroketones attack many of the materials employed in making gaskets, and, therefore, not only require the use of special gasket materials but also enhance the opportunities for leaks. In addition the chloroketones, when by chance come into contact with skin, cause burning which results in painful slow healing blistering of the skin. The alpha-thiocyano carbonyl compounds employed as reactants in the process of this invention do not possess any of these undesirable properties.

Furthermore the chloroketones employed in the methods of the prior art require the use of elemental chlorine in their preparation. In times of national emergency and in periods of expansion of the chemical industry, the supply of elemental chlorine does not meet the demand. It becomes, therefore, essential that the available supply of chlorine be employed where there is no substitute for this versatile element. The 2-mercaptothiazoles are widely used in large quantities as accelerators for the vulcanization of natural and crude rubber compositions. Hence the discovery of a non-chlorinated reactant which can be employed in the preparation of these important thiazole derivatives aids the chemical industry in releasing chlorine for the preparation of other essential products while still providing an ample supply of accelerator for the rubber industry.

In the process of this invention there can be employed any alphathiocyano carbonyl compound. Such a compound, will of course, contain the structure

and will have only the one oxygen attached to the carbonyl carbon atom, that is, it will be an alpha-thiocyano ketone or aldehyde. Ordinarily it will contain, in addition to the carbonyl oxygen atom and the nitrogen and sulfur atoms of the thiocyano group, only carbon and hydrogen atoms as when it possesses the structure $$\begin{array}{c} R_1-C=O \\ | \\ R_2-C-SCN \\ | \\ H \end{array}$$

wherein $R_1$ and $R_2$ are hydrogen or hydrocarbon groups; however, $R_1$ and $R_2$ may also be radicals containing elements other than carbon and hydrogen present in non-reactive structure, as, for example, oxygen in ether linkages, sulfur in thioether linkages, nitrogen and oxygen in nitro groups, etc. All such alphathiocyano aldehydes and ketones are known types of compounds and can be readily prepared by the reaction of thiocyanogen with an aldehyde or ketone as follows:

$$R_2-CH_2-\overset{O}{\overset{\|}{C}}-R_1 + (SCN)_2 \longrightarrow R_2-CH-\overset{O}{\overset{\|}{C}}-R_1 + HSCN$$
$$\phantom{R_2-CH_2-\overset{O}{\overset{\|}{C}}-R_1 + (SCN)_2 \longrightarrow R_2-CH}|$$
$$\phantom{R_2-CH_2-\overset{O}{\overset{\|}{C}}-R_1 + (SCN)_2 \longrightarrow R_2-CH}SCN$$

As examples of alpha-thiocyano carbonyl compounds which are suitable reactants for the process of this invention, there may be mentioned such alpha-thiocyano-aldehydes as:

Thiocyano-acetaldehyde,
Alpha-thiocyano-n-propionaldehyde,
Alpha-thiocyano-n-butyraldehyde,
Alpha-thiocyano-n-valeraldehyde,
Alpha-isopropyl-alpha-thiocyano-acetaldehyde,
Alpha-benzyl-alpha-thiocyano-acetaldehyde,
Alpha-phenyl-alpha-thiocyano-acetaldehyde,
Alpha-naphthyl-alpha-thiocyano-acetaldehyde,
Alpha-cyclohexyl-alpha-thiocyano-acetaldehyde,
Alpha-thiocyano-alpha-ethoxy acetaldehyde,
Alpha-thiocyano-beta-chlorobutyraldehyde, and
Alpha-thiocyano-beta-ethoxy butyraldehyde;

and such alpha-thiocyano ketones as for example:

1-thiocyano-propanone-2;
3-thiocyano-butanone-2;
3-thiocyano-pentanone-2;
3-thiocyano-hexanone-2;
3-thiocyano-heptanone-2;
3-phenyl-3-thiocyano-propanone-2;
3-cyclohexyl-3-thiocyano-propanone-2;
4-phenyl-3-thiocyano-butanone-2;
5-phenyl-3-thiocyano-pentanone-2;
6-phenyl-3-thiocyano-hexanone-2;
3-naphthyl-3-thiocyano-propanone-2;
5-p-tolyl-3-thiocyano-pentanone-2;
3-thiocyano-4-pentenone-2;
2-thiocyano-pentanone-3;
2-thiocyano-hexanone-3;
1-thiocyano-hexanone-2;
Alpha-thiocyano propionphenone;
1-phenyl-3-thiocyano-butanone-2;
1-phenyl-4-thiocyano-pentanone-3;
Alpha-thiocyano propiononaphthone;
4-thiocyano-hexanone-3;
3-thiocyano-heptanone-4;
2-thiocyano-octanone-3;
Alpha-thiocyano-pentanophenone;
1-phenyl-3-thiocyano-pentanone-2;
1-phenyl-4-thiocyano-hexanone-3;
Alpha-thiocyano-pentanonaphthone;
5-thiocyano-1-heptenone-4;
1-cyclohexyl-1-thiocyano-propanone;
1-cyclohexyl-2-thiocyano-propanone;
1-cyclohexyl-2-thiocyano butanone;
1-methoxy-3-thiocyanobutanone-2;
1-(methyl-thio)-3-thiocyanobutanone-2;
2-thiocyano-1-isopropoxy-butanone-3;
2-thiocyano-1-(isopropyl-thio)-butanone-3;
2-thiocyano-1-ethoxy-butanone-3;
2-thiocyano-1-(ethyl-thio)-butanone-3;
2-thiocyano-1-o-nitrophenyl-butanone-3;
2-thiocyano-1,5-di-phenyl-6-nitrohexanone-3;
3-thiocyano-1-butoxy-2-methylhexanone-4;
4-thiocyano-1-ethoxy-5-methylhexanone-3;
2-thiocyano-cyclopentanone;
2-thiocyano-cyclo-hexanone;
2,5-di(thiocyano)-1,4-cyclohexanedione;
2,3-di(thiocyano)-1,4-cyclohexanedione;
2,3-di(thiocyano)-1,4-pentanedione;
2,5-di(thiocyano)-1,6-decanedione; and
2-(alpha-thiocyanoacetonyl)-cyclohexanone.

Although any alpha-thiocyano carbonyl compound containing the structure hereinbefore set forth can be employed as a reactant according to the process of this invention, the alpha-thiocyano ketones, where $R_1$, in the general formula hereinbefore appearing, is a hydrocarbon group are preferred as reactants because at present they are more readily available.

Any of the mineral acids such as hydrochloric, sulfuric, phosphoric, and other mineral acids can be employed in the process of this invention, but hydrochloric acid is the preferred mineral acid for this process. The quantity of acid to be employed in the process of this invention can be varied from about one mole to two or more moles per mole of thiourea.

A more detailed description of the process of this invention is as follows. To an aqueous solution containing the mineral acid there is added a thiocyano carbonyl compound and thiourea in the proportions of at least one mole and preferably two or more moles of thiourea per mole of the thiocyano carbonyl. A water-miscible solvent which facilitates solution of thiourea can also be added if desired. This mixture is stirred and heated to a temperature of from 50° to 110° C. for a substantial time interval. It is preferred to carry out the reaction at the reflux temperature of the reaction mixture. The 2-mercaptothiazole is formed during the reaction as a crystalline precipitate which is easily recovered from the aqueous reaction medium.

The following specific example will further illustrate the process of this invention.

EXAMPLE

There was charged to a reactor containing 40 parts by weight of ethanol and 276 parts by weight of a dilute aqueous solution containing 18 parts by weight of HCl; 12.9 parts by weight of 3-thiocyanobutanone-2 and 15.2 parts by weight of thiourea. The resulting mixture was stirred and heated to reflux temperature (86° C.) for ten hours. During reflux a crystalline precipitate formed which was recovered by filtration. This product had a melting point of 158° to 162° C. After two recrystallizations from an 8 to 1 mixture of water and ethanol the purified product was a light yellow crystalline solid melting at 161.5° to 164.5° C. Ultra violet absorption spectrum of this product was identical with that of 2-mercapto-4,5-dimethylthiazole. Therefore the product of the chemical reaction was 2-mercapto-4,5-dimethylthiazole.

The following examples in tabular form are presented to illustrate the variety of 2-mercaptothiazoles which can be prepared according to the process of this invention.

*Products of reaction of thiourea with an alpha-thiocyano carbonyl compound*

| Example No. | Thiocyano Carbonyl | Product |
|---|---|---|
| 2 | 1-thiocyanobutanone-2 | 2-mercapto-4-ethylthiazole. |
| 3 | Thiocyano acetaldehyde | 2-mercaptothiazole. |
| 4 | Alpha-thiocyano propionaldehyde | 2-mercapto-5-methylthiazole. |
| 5 | 2-isopropyl-2-thiocyano acetaldehyde | 2-mercapto-5-isopropylthiazole. |
| 6 | 2-phenyl-2-thiocyano acetaldehyde | 2-mercapto-5-phenylthiazole. |
| 7 | 3-thiocyano hexanone-2 | 2-mercapto-5-propyl-4-methyl-thiazole. |
| 8 | 4-phenyl-3-thiocyano-butanone-2 | 2-mercapto-5-benzyl-4-methyl-thiazole. |
| 9 | 2-thiocyano-heptanone-3 | 2-mercapto-4-methyl-5-n-butylthiazole. |
| 10 | 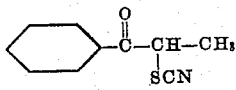 Alpha-thiocyano propiono-phenone | 2-mercapto-4-methyl-5-phenylthiazole. |
| 11 | 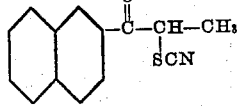 Alpha-thiocyano propiono-naphthone | 2-mercapto-4-naphthyl-5-methyl-thiazole. |
| 12 | 3-thiocyano-octanone-4 | 2-mercapto-4-butyl-5-ethyl-thiazole. |
| 13 | 1-phenyl-4-thiocyano hexanone-3 | 2-mercapto-4-phenethyl-5-ethyl-thiazole. |
| 14 | 5-thiocyano-1-heptenone-4 | 2-mercapto-4-allyl-5-ethyl-thiazole. |
| 15 | 3-thiocyano-4-hexenone-2 | 2-mercapto-4-methyl-5-allyl-thiazole. |

Any of the other thiocyano carbonyl compounds of the class hereinbefore defined can be employed as a reactant in place of those employed in the above examples to produce corresponding 2-mercaptothiazoles.

Although I have illustrated my invention with the preparation of certain specific 2-mercaptothiazoles, employing special thiocyano carbonyls, I do not thereby desire or intend to limit myself solely thereto, for as hitherto stated reactants which are the chemical equivalents of those employed may be substituted for the specific reactants used in the examples and the precise proportions of the reactants can be varied, if desired, without departing from the spirit and scope of the invention as defined in the appended claims.

I claim:

1. The method which comprises reacting an alpha-thiocyano carbonyl with thiourea in the presence of a dilute aqueous solution of a mineral acid thereby to form a 2-mercaptothiazole.

2. The method which comprises reacting thiourea with an alphathiocyano carbonyl compound having the structure

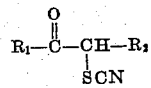

wherein $R_1$ and $R_2$ are members selected from the class consisting of hydrogen and hydrocarbon groups containing from 1 to 10 carbon atoms, in the presence of a dilute aqueous solution of HCl and at reflux temperature, thereby to form a 2-mercaptothiazole and recovering said thiazole.

3. The method which comprises reacting at reflux temperature 3-thiocyanobutanone-2 with thiourea in the presence of a dilute aqueous solution of HCl thereby to form 2-mercapto-4,5-dimethylthiazole, and recovering said thiazole.

JAMES T. GREGORY.

No references cited.